(12) United States Patent
Motta

(10) Patent No.: US 7,797,695 B2
(45) Date of Patent: Sep. 14, 2010

(54) EFFICIENT GENERATOR OF UPDATE PACKAGES FOR MOBILE DEVICES

(75) Inventor: Giovanni Motta, Dana Point, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1301 days.

(21) Appl. No.: 11/316,292

(22) Filed: Dec. 21, 2005

(65) Prior Publication Data

US 2006/0107260 A1    May 18, 2006

Related U.S. Application Data

(60) Provisional application No. 60/637,942, filed on Dec. 21, 2004.

(51) Int. Cl.
*G06F 9/44*    (2006.01)

(52) U.S. Cl. .................... 717/168; 717/170; 717/171

(58) Field of Classification Search .................. 717/168
See application file for complete search history.

(56) References Cited

U.S. PATENT DOCUMENTS

| | | | | |
|---|---|---|---|---|
| 4,807,182 A | * | 2/1989 | Queen ........................ | 715/210 |
| 5,450,589 A | * | 9/1995 | Maebayashi et al. ........ | 717/170 |
| 5,479,654 A | * | 12/1995 | Squibb ........................ | 707/201 |
| 5,790,860 A | * | 8/1998 | Wetmore et al. ............ | 717/122 |
| 6,018,747 A | * | 1/2000 | Burns et al. ................. | 707/203 |
| 6,145,012 A | * | 11/2000 | Small ........................ | 709/246 |
| 6,526,574 B1 | * | 2/2003 | Jones ........................ | 717/168 |
| 6,564,369 B1 | * | 5/2003 | Hove et al. ................. | 717/121 |
| 7,680,828 B2 | * | 3/2010 | Gorelik ...................... | 715/200 |
| 2004/0093557 A1 | * | 5/2004 | Kawatani .................... | 715/500 |

* cited by examiner

Primary Examiner—Lewis A Bullock, Jr.
Assistant Examiner—Hang Pan

(57) ABSTRACT

An efficient generator of update packages employs a new command SET PTR CACHE to take advantage of a rudimentary caching mechanism that allows exploiting of local patterns in pointer replacements.

7 Claims, 5 Drawing Sheets

305 

```
V[ ] = V₁[ ], V₂[ ];  307      // V is the cat of V1 and V2
P = P_old = V₂;                // P points to the beginning of V2
While(more stuff to encode) {
       Find in V[0,…,P-1] all matches for data starting at P
       Store and rank matches according to their cost C(M)
       If(no matches){
              Output code corresponding to SET DATA
              Output <length> of the section that doesn't match
              Output <data>
              P =P + <length>
       } else {
              Output code corresponding to COPY
              Output <from> and <length> parameters
              P_old = P
              P = P + <length>                                  309 
              For(each mismatch){
                     Output code corresponding to SET PTR <length>
                     Output <from> and <data>
              }
       }
}
```

```
//
// INPUT: A COPY match, its parameters and all mismatches
// OUTPUT: The cost of the match
// SIDE EFFECT: Cache update
//                                                               507
Cost = 0;                                // Estimated cost of the match
Cost += Cost(COPY) + Cost(<from>) + Cost(<length>);
For each mismatch M of length L {
        If the pair (M.old, M.new) is in the cache position I {
                Cost += Cost(SET PTR CACHE L) + Cost(<from>);
        } Else If  = M.new - M.old is in the cache position I {
                Cost += Cost(SET PTR CACHE , L, I) + Cost(<from>);
                ReplaceEntry(I, M.old, M.new, );
        } Else {
                Cost += Cost(SET PTR L) + Cost(<from>) + Cost(M.new);
                If CacheFull() {
                        I = EntryLRU();    // Last recently used entry
                          = M.new - M.old                               511
                        ReplaceEntry(I, M.old, M.new, );
                } Else {
                        I = CacheSize()
                        InsertEntry(I, M.old, M.new, );
                }
        }
        UpdateTimeStamp(I);
}
Cost /= <length>;
```

EFFICIENT GENERATOR OF UPDATE PACKAGES FOR MOBILE DEVICES

RELATED APPLICATIONS

The present application makes reference to, is a continuation of, and claims benefit of U.S. Provisional Patent Application No. 60/637,942, entitled "AN EFFICIENT GENERATOR OF UPDATE PACKAGES FOR MOBILE DEVICES", filed on Dec. 21, 2004, the complete subject matter of which is hereby incorporated herein by reference, in its entirety.

The present application makes reference to PCT Application with publication number WO/02/41147 A1, PCT number PCT/US01/44034, filed 19 Nov. 2001, which in turn is based on a provisional application 60/249,606 filed 17, Nov. 2000, both of which are incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

There is a problem with generating update packages in an efficient mode when at least a portion of the content in a mobile phone image is compressed, or encrypted, or both. There is a problem in minimizing the size of an update package that contains a difference information for a code transition between an old version to a new version.

A common problem in the differential compression of executable files is the pointer mismatch due to code relocation. When a block of code is moved from a memory region to another, all pointers to that region will change accordingly. If in the old version a pointer points to an address A and in the new version of the same code, the same pointer points to B, it is likely that other pointers to A will be changed in the new version into pointers to B. Incorporating such issues into a solution is not easy. In addition, automating the generation of update packages when code changes dramatically between an old version and a newer version is still an art form and prone to errors, and therefore needs tweaking.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a generator of update packages for a mobile device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The numerous objects and advantages of the present invention may be better understood by those skilled in the art by reference to the accompanying figures in which:

FIG. 3 provides a pseudocode for the cost function.

FIG. 5 provides a pseudocode for the caching technique.

DETAILED DESCRIPTION OF THE INVENTION

Aspects of the present invention relate generally to generation of update packages that are used to update of mobile devices that contain firmware and software. The following discussion makes reference to the term "electronic device" that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile. The following discussion makes reference to the term "generator" that is used herein to refer to a tool that creates a difference information between two firmware versions, two software versions. In general, the generator creates difference information between two images and generates an update package. The following discussion also makes reference to the term "network" that is used herein to refer to networks such as, for example, an operator network, an enterprise network, an Internet based network, a management network for a service, etc.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, to name just a few. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., errors) in the operating code of the electronic device. In a representative embodiment of the present invention, update information may comprise an update package.

Figure 1:
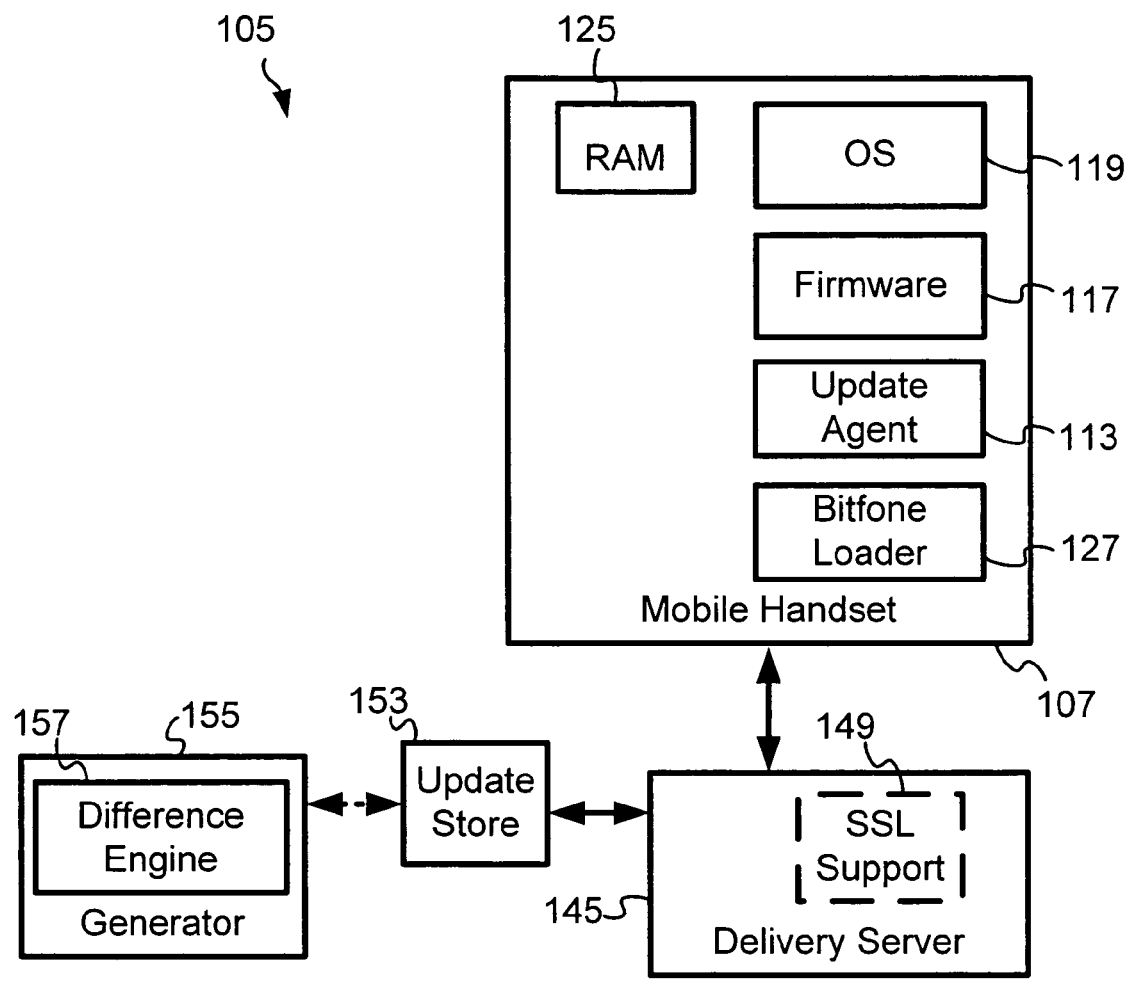
FIG. 1 is a perspective diagram of a mobile handset network that employs a generator to generate update packages and an update agent in a mobile device that is capable of updating firmware and software in the mobile device using the update packages.

FIG. 1 is a perspective diagram of a mobile handset network 105 that employs a generator 155 to generate update packages and an update agent 113 in a mobile device 107 that is capable of updating firmware 117 and software 119 in the mobile device 107 using the update packages. The mobile handset network 105 comprises the generator 155 capable of generating update packages that are employed to update firmware 117/software 119 in mobile handsets 107, an update store 153 that acts as a repository of update packages, a delivery server 145 that dispenses update packages and the mobile handset 107 that retrieves update packages from the delivery server 145 to update its firmware 117/software 119.

In general, the update agent 113 is resident in an embedded device, such as a mobile handset 107 (cell phones). The update agent 113 is implemented in hardware in one related embodiment, and in software in another related embodiment, and is employed to use an update package to update firmware 117 and/or software 119 resident in non-volatile memory of the mobile handset 107, such as a NAND based flash memory or a NOR based flash memory. The update process has to be fault tolerant in the mobile device. Typically, a fault tolerant update agent is employed for such update or firmware or software in the mobile handset 107.

The present invention comprises a generator engine that is capable of addressing of the problem of pointers mismatch. A common problem in the differential compression of executable files is the pointer mismatch due to code relocation. When a block of code is moved from a memory region to another, all pointers to that region will change accordingly. If in the old version a pointer points to an address A and in the new version, the same pointer points to B, it is likely that other pointers to A will be changed in the new version into pointers to B.

Since code is moved in blocks, it is likely that also pointers in the form A+k will be changed into B+k. This phenomenon, while relatively simple to understand and predictable, compromises the matching paradigm on which COPY/SET differential encoding is typically based. In accordance with the present invention, the generator aims at addressing the effect of this mismatch.

A matching technique has been designed that incorporates the techniques taught by the present invention. The basic idea is to redesign the matching process in order to allow a number of short mismatches having mismatch length MMlen≦4 or MMlen≦8 bytes. In order to simplify the development and isolate the effect of the restrictions due to the embedded requirements, a non in-place implementation is adopted. The compression loss of an in-place implementation could be assessed by applying the current technique to sort the writing units. In one embodiment, the preprocessing of images of code is not necessary.

The old and the new version of the executable code (from now on, indicated with V1 and V2) are concatenated into a single array, with V2 following V1. Let V be the name of this array.

As in the current implementations, a CRC-based hashing is computed on V. The CRC length implies a limitation on the size of the minimum match and it can be kept to CRClen=8, as in the current version, increased or decreased as necessary.

V2 is scanned from the beginning to the end, let P be a pointer to the section currently being encoded. A CRC is computed with the bytes (V2[P], . . . , V2[P+ CRClen-1]). Through a matching process similar to the one currently being used, the program looks for matches starting at an address smaller than V2[P]. All matches found are ranked according to a cost function and stored in a table. Optionally, the table can have a fixed length and only the best matches are retained.

The main difference with the prior matching techniques is that mismatches of length up to MMlen are tolerated, meaning that the matching process stops only when more than MMlen consecutive bytes are not matching.

It is important to notice that a match for a segment starting at V2[P] should be allowed to run past V2[P].

The output generated from the generator is captured in an update package. In order to reconstruct V2 from V1 a "delta" file D must be generated from the matches. The delta file will contain commands in the form of COPY and SET. The present invention provides for different flavors of SET commands.

Follows a description of the commands employed in the present invention:

COPY <from><length>: Starting from the current pointer P, a block of <length> bytes is copied from the location <from>. The offset <from> is an offset relative to P. The pointer P is updated to P+<length> to take into account the <length> bytes added to the file. The old value of P is saved into a variable Pold.

SET PTR <length><from><data>: A block <data> of length <length>is copied starting from Pold+<from>. <length> is smaller or equal to MMlen. P and Pold are unchanged. If the command SET PTR CACHE is implemented, the execution of a SET PTR should also write in the cache memory the parameters of this command.

SET DATA <length><data>: The block <data> of length <length> is copied starting from the current pointer P. The pointer P is updated to P+<length>.

SET PTR CACHE <length><from>: This mode should bring some gain by exploiting point a) described in the Background section. The implementation of this mode relies on the use of a caching mechanism. The caching technique should match the bytes starting from Pold+<from> with an entry in a small cache table holding mismatched pairs of sequences having <length> bytes. This command is used to signal that the mismatched pair is in the cache.

SET PTR CACHE □ <length><pos><from>: This mode should bring some gain by exploiting point b) described in the Background section. If no exact match is found in the cache, a pair having the same difference □ is sought. If such a pair is found, its position <pos> is sent to the decoder as a parameter of this command.

The present invention employs a Cost Function. During the matching process, multiple matches are ranked according to a cost function that estimates the benefits of using each match. As a first approximation, we could use a fixed length encoding for the COPY and the SET PTR commands and compute the average cost per byte of each match.

Let's assume that a match M is encoded as:
COPY <from_0> <length_0>
SET PTR <from_1> <length_1> <data_1>
SET PTR <from_2> <length_2> <data_2>
. . .
SET PTR <from_n> <lengthen> <data_n>
The individual contributions to the final cost being:
COPY and SET PTR=Cost(<cmd>) bytes each (for example 1 byte)
<from>=Cost(<from>) bytes (for example 4 bytes)
<length>=Cost(<length>) bytes (for example 4 bytes)
<data_i>=<length_i> bytes Then:

$$Cost(M) = \frac{(n+1)*(Cost(\langle cmd \rangle) + Cost(\langle from \rangle)) + Cost(\langle length \rangle)) + \sum_{i=1}^{n} length_i}{length_0}$$

Is the cost of encoding the match M expressed in $$\frac{\text{code bytes}}{\text{match bytes}},$$

so the smaller the better.

Ideally, if no entropy encoder is used to further compress the stream of commands and parameters, the cost of a match should be strictly smaller than 1. Having a more expensive match implies that the COPY operation expands the file instead of compressing it.

An alternative could be to compare the cost of the COPY (given by the previous or by an equivalent formula) with the cost of a SET DATA for the same block length. If the cost of the COPY is bigger than SET DATA, then the match is discarded and the matching process resumes from the next byte.

EXAMPLE 1

Let's assume that Cost(<cmd>)=1 and Cost(<from>)= Cost(<length>)=4 and that there are a total of 6 mismatches each having <length_i>=4 bytes. The length of the match <length_0>=600 bytes. The total cost for this match would be:

$$Cost(M) = \frac{(6+1)*(1+4+4)+(6*4)}{600} = \frac{87}{600} = 0.145$$

The cost tells us that we spend 0.145 bytes to encode each byte of the match.

EXAMPLE 2

In practice we can do better and refine this figure by observing that the length parameter in the SET PTR command is bounded to be smaller or equal than MMlen. Since this length is typically small it might be possible to encode it in the command byte and save 4 bytes from the encoding of each SET PTR command. If the command byte is used to encode the SET PTR length as well, the cost becomes:

$$Cost(M) = \frac{Cost(\langle length \rangle) + (n+1)*(Cost(\langle cmd \rangle) + Cost(\langle from \rangle)) + \sum_{i=1}^{n} length_i}{length_0}$$

And the cost of the example will be given by:

$$Cost(M) = \frac{4 + (6+1)*(1+4)+(6*4)}{600} = \frac{63}{600} = 0.105$$

The second step would be to include in the costs function the benefits derived from the use of the command SET PTR CACHE. Ideally, the cost should be as close as possible to the bit budget spent in the final encoding.

The coding of the Command Parameters is also addressed in the present invention.

In the following, we list a number of considerations that could be helpful when encoding the command parameters explicitly or implicitly:

COPY <from> <length>

<from> is always greater than zero and smaller than Size(V1)+Size(V2). If the technique is implemented in-place, then <from> is smaller than max(Size(V1), Size(V2))+O(1).

Figure 2:
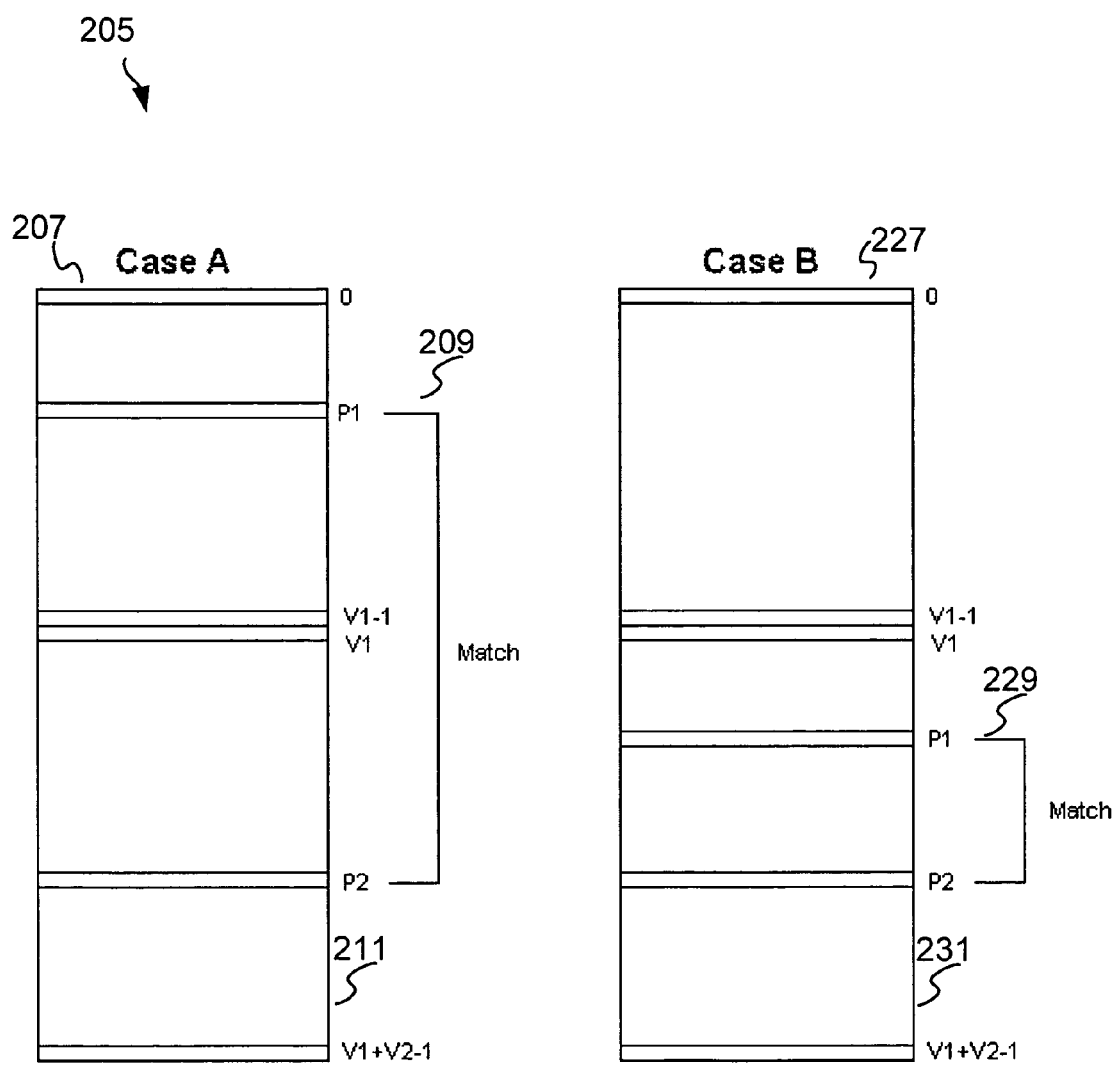
FIG. 2 provides details of two cases where the encoding of the "FROM" parameter for a COPY command is addressed.

There are three possible alternatives for the encoding of the <from> parameter. The first is to specify an absolute position in the file V. A better alternative is the specification of the difference between the pointers of the two matching blocks. The third one, probably leading to a shorter encoding, consists of specifying the difference between the positions of the two matches in their respective files. With reference to FIG. 2:

|  | Case A | Case B |
|---|---|---|
| Position in V | $P_1$ | $P_1$ |
| Difference between positions in V | $P_2 - P_1$ | $P_2 - P_1$ |
| Difference between positions in $V_1$ and $V_2$ | $P_2 - V_1 - P_1$ | $P_2 - P_1$ |

FIG. 2 provides details of two cases where the encoding of the "FROM" parameter for a COPY command is addressed. It is important to remember that the old and the new version of the executable code (indicated with V1 and V2) are concatenated into a single array, with V2 following V1 and V is the name of this array. The Case A 207 and a Case B 227 both comprise of a a code block that has moved. The position in the array V is P1 209 in Case A and P1 229 in Case B. The difference between positions in array V are computed as (P2-P1) and (P2-P1) respectively. Again, computing the difference between positions in V1 and V2, we get (P2-V1-P1) and (P2-P1). When the third option is used, the code for the command should differentiate whether the match is between V1 and V2 or among two parts of V2.

Thus, FIG. 1 provides information on the encoding of the <from> parameter for the COPY command. In the COPY command. The parameter <length> is a positive integer always greater than the minimum match length and smaller than Size(V2).

SET PTR <from> <length> <data>

<from> is an offset from Pold so it is greater than the minimum match length and smaller than <length> of the last COPY command.

<length> is greater than zero and smaller or equal to MMlen.

<data> could be encoded as a difference, as it is currently done.

SET DATA <length> <data>

<length> is greater than zero and smaller than Size(V2).

SET PTR CACHE <length> <from>

<length> is between 1 and MMlen.

<from> is an offset from Pold so it is greater than the minimum match length and smaller than <length> of the last COPY command.

SET PTR CACHE □ <length> <pos> <from>

<length> is between 1 and MMlen.

<pos> is an index of a valid cache entry.

<from> is an offset from Pold so it is greater than the minimum match length and smaller than <length> of the last COPY command.

When availability of opcodes allows it, parameters like <length> and <pos> can be jointly encoded with the commands.

FIG. 3 provides a pseudocode for the cost function.

The cost function in the pseudocode (FIG. 2) assumes non caching, mismatches with MMlen<=32, COPY, SET DATA and SET PTR commands encoded with 1 byte, <from> and <length> parameters encoded with 4 bytes and the <length> of the SET PTR implicitly encoded in the command code (see Example 2 and Section 2.6).

A structure stores all candidate matches for a given segment, keeping track of the following information for each match: starting point, length, number of mismatches, total length of all mismatches. With these parameters, the cost of a match is computed as:

$$\text{Cost}(M) = \frac{4 + 5 * (1 + \text{number of mismatches}) + \text{total length of all mismatches}}{\text{length of the match}}$$

The structure that holds the matches can be enriched by recording details on all mismatches; this is not necessary right now, but it could help the transition to an implementation that also includes SET PTR CACHE.

The coding of the Commands is typically done in 1 byte. In the following, we outline a possible encoding for the commands that uses a fixed length of one byte. This encoding is improved by taking into account commands statistics. We assume that MMlen<=2 and that the mismatched pointers are stored into MMlen separate tables each having 100 entries. Parameters having small range, like <length> and <pos> are encoded implicitly. The corresponding cost function should reflect implicit encoding.

| | | |
|---|---|---|
| COPY FROM V1 | 0x00 | |
| COPY FROM V2 | 0x01 | |
| SET DATA | 0x02 | (Length parameter follows) |
| SET DATA <length> | 0x03 | (<length> = 1) |
| . | . | . |
| . | . | . |
| . | . | . |
| SET DATA <length> | 0x33 | (<length> = 49) |
| SET PTR <length> | 0x34 | (<length> = 1) |
| SET PTR <length> | 0x35 | (<length> = 2) |
| SET PTR CACHE <length> | 0x36 | (<length> = 1) |
| SET PTR CACHE <length> | 0x37 | (<length> = 2) |
| SET PTR CACHE ☐ <length> <pos> | 0x38 | (<length> = 1, <pos> = 0) |
| . | . | . |
| . | . | . |
| . | . | . |
| SET PTR CACHE ☐ <length> <pos> | 0x9B | (<length> = 1, <pos> = 99) |
| SET PTR CACHE ☐ <length> <pos> | 0x9C | (<length> = 2, <pos> = 0) |
| . | . | . |
| . | . | . |
| SET PTR CACHE ☐ <length> <pos> | 0xFF | (<length> = 2, <pos> = 99) |

The present invention incorporates the cache prediction component.

The command SET PTR CACHE takes advantage of a rudimentary caching mechanism that allows exploiting of local patterns in the pointers replacement. In the following we describe a possible implementation.

The main data structure is a set of MMlen tables, each having Csize entries (the previously outlined command encoding uses Csize=127). Each table, records pointer replacements of a specific length and its entries contain the mismatched strings in the old file, the one in the new file, the numerical difference between these two values and a time stamp that will be used for the cache replacement heuristic. Given the small size, a suggested implementation for the experimental version could use arrays, in the future it might be better to resort to a simplified hashing, for example linear.

Cache entries are created by the execution of the SET PTR command. Also, it should be determined experimentally whether it is advantageous to replace a cache entry when it is accessed for the offset by a SET PTR CACHE command. If the table is full, a new SET PTR entry should replace the least recently used. This is implemented by keeping a counter associated to each table. When a new entry is used or inserted, the counter value is assigned to the time stamp field and the counter incremented by one unit. If the table is full, the item with the lowest count is found and replaced. While performing the increment it can be necessary to detect counter overflow and rescale the time stamps when this happens.

Figure 4:
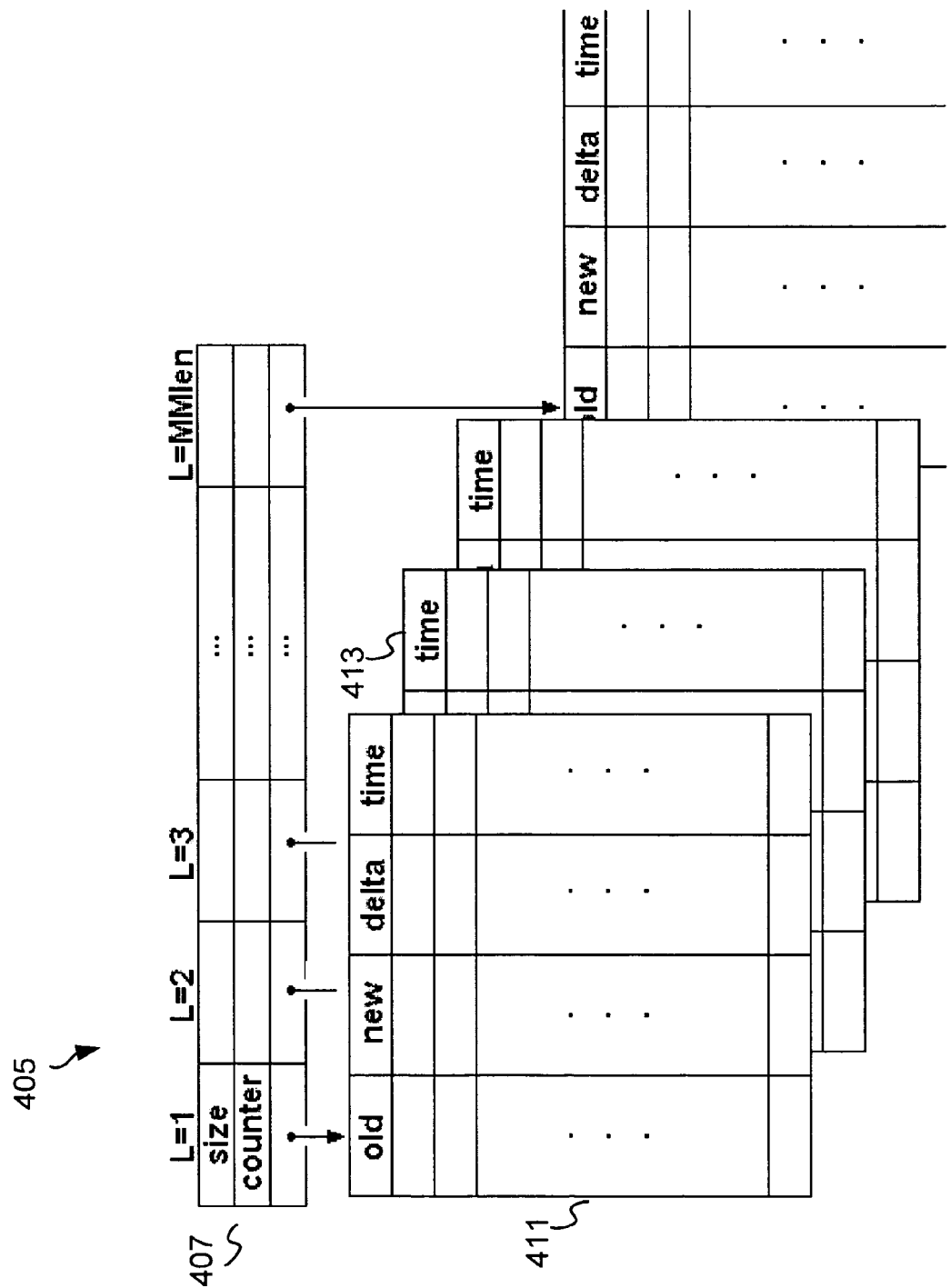
FIG. 4 shows the pseudocode that handles the caching and the computation of the cost associated to a COPY match.

FIG. 4 shows the pseudocode that handles the caching and the computation of the cost associated to a COPY match. It provides details on the cache prediction function.

FIG. 5 provides a pseudocode for the caching technique.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A generator, embedded as firmware in non-volatile memory of a mobile device and executable to generate a difference information by comparing a first version of code to a second version of code, the generator comprising:
   a matching function that detects matches in code strings between the first version of code and the second version of code;
   the matching function allowing for a limited number of mismatches having a mismatch length which is less than or equal to an established mismatch length, wherein the limited number of mismatches is greater than one but fewer than all of the mismatches having a mismatch length which is less than or equal to the established mismatch length;
   wherein the matching stops when more than the limited number of mismatches having a mismatch length which is less than or equal to the established mismatch length of consecutive bytes are found not to match, or when more than the established mismatch length of consecutive bytes are found not to match; and
   wherein the limited number of mismatches is determined according to a cost function which ensures that a cost to encode a byte of a match is less than each byte of the match.

2. The generator in claim 1 wherein the difference information generated is for a non in-place implementation of an update activity.

3. The generator in claim 1 wherein the established mismatch length is less than one of 4 bytes or 8 bytes.

4. A mobile network that includes a generator to facilitate accuracy of updates to at least one mobile device, the network comprising:
- a mobile device;
- a delivery server to that is able to facilitate retrieval of an update package by the mobile device;
- a generator capable of generating a difference information by comparing a first version of code to a second version of code for providing the update package to the mobile device, wherein the update package is employed to update firmware and/or software in the mobile device, and wherein the generator is embedded as firmware in non-volatile memory of the mobile device to:
  - detect matches in code strings between the first version of code and the second version of code;
  - allow for a limited number of mismatches having a mismatch length which is less than or equal to an established mismatch length, wherein the limited number of mismatches is greater than one but fewer than all of the mismatches having a mismatch length which is less than or equal to the established mismatch length;
  - wherein the matching stops when more than the limited number of mismatches having a mismatch length which is less than or equal to the established mismatch length of consecutive bytes are found not to match or when more than the established mismatch length of consecutive bytes are found not to match; and
  - wherein the limited number of mismatches is determined according to a cost function which ensures that a cost to encode a byte of a match is less than each byte of the match.

5. The mobile network of claim 4 wherein the difference information generated is for a non in-place implementation of an update activity.

6. The mobile network of claim 4 wherein the established mismatch length is less than one of 4 bytes or 8 bytes.

7. A mobile network that includes a generator to facilitate accuracy of updates to at least one mobile device, the network comprising:
- a mobile device;
- a delivery server to that is able to facilitate retrieval of an update package by the mobile device;
- a generator capable of generating a difference information by comparing a first version of code to a second version of code for providing the update package to the mobile device in association with encoding and decoding the update package, wherein the update package is employed to update firmware and/or software in the mobile device, and wherein the generator is embedded as firmware in non-volatile memory of the mobile device to:
  - detect matches in code strings between the first version of code and the second version of code;
  - allow for a limited number of mismatches having a mismatch length which is less than or equal to an established mismatch;
  - wherein mismatches of length up to the established mismatch length are tolerated up to the limited number of mismatches and wherein the matching stops when more than the limited number of mismatches having a mismatch length which is less than or equal to the established mismatch length of consecutive bytes are found not to match or when more than the established mismatch length of consecutive bytes are found not to match; and
  - wherein the limited number of mismatches is determined according to a cost function that ensures a cost of a match to encode a byte of a match is less than each byte of the match.

* * * * *

UNITED STATES PATENT AND TRADEMARK OFFICE
CERTIFICATE OF CORRECTION

| | | |
|---|---|---|
| PATENT NO. | : 7,797,695 B2 | Page 1 of 1 |
| APPLICATION NO. | : 11/316292 | |
| DATED | : September 14, 2010 | |
| INVENTOR(S) | : Giovanni Motta | |

It is certified that error appears in the above-identified patent and that said Letters Patent is hereby corrected as shown below:

In column 9, line 28, in Claim 4, after "match" insert -- , --.

In column 10, line 29, in Claim 7, after "match" insert -- , --.

Signed and Sealed this

Nineteenth Day of April, 2011

David J. Kappos
*Director of the United States Patent and Trademark Office*